C. P. CASS.
SAFETY CAR CONTROL DEVICE.
APPLICATION FILED APR. 2, 1920.
1,390,602. Patented Sept. 13, 1921.
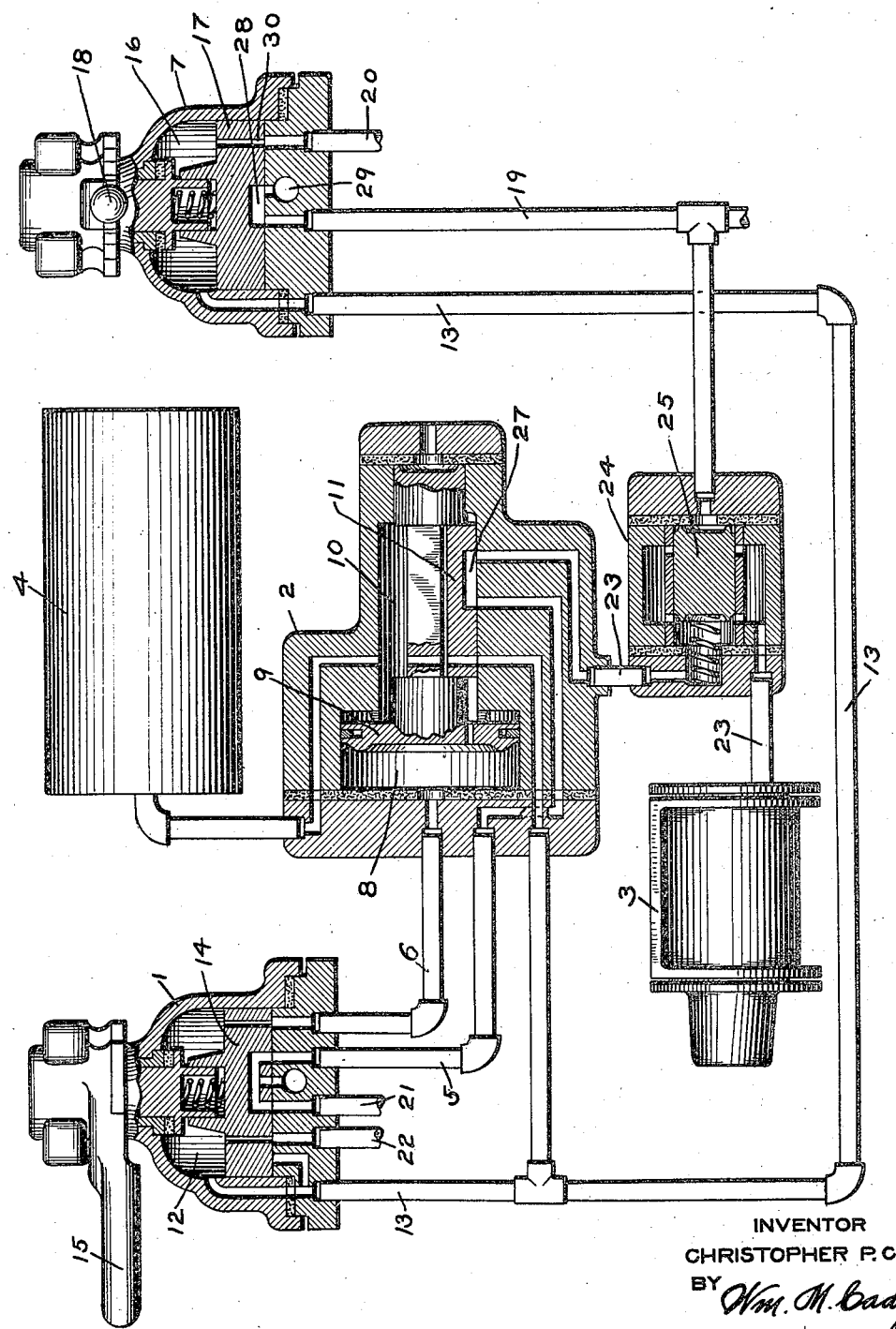
INVENTOR
CHRISTOPHER P. CASS
BY Wm. M. Cady
ATTORNEY

UNITED STATES PATENT OFFICE.

CHRISTOPHER P. CASS, OF ST. LOUIS, MISSOURI, ASSIGNOR TO THE WESTINGHOUSE AIR BRAKE COMPANY, OF WILMERDING, PENNSYLVANIA, A CORPORATION OF PENNSYLVANIA.

SAFETY CAR-CONTROL DEVICE.

1,390,602.

Specification of Letters Patent. Patented Sept. 13, 1921.

Application filed April 2, 1920. Serial No. 370,756.

*To all whom it may concern:*

Be it known that I, CHRISTOPHER P. CASS, a citizen of the United States, residing at St. Louis, in the State of Missouri, have invented new and useful Improvements in Safety Car-Control Devices, of which the following is a specification.

This invention relates to apparatus for controlling the brakes and the car doors of an electric traction car.

The principal object of my invention is to provide means whereby the conductor can operate a car door independently of the motorman.

In the accompanying drawing, the single figure is a diagrammatic view, partly in section, of a brake and car door controlling apparatus embodying my invention.

As shown in the drawing, the apparatus may comprise a motorman's brake valve device 1, an emergency valve device 2, a brake cylinder 3, a main reservoir 4, a straight air pipe 5, an emergency brake pipe 6, and a valve device 7 by which the conductor controls a car door.

The emergency valve device 2 may comprise the usual casing having a piston chamber 8, connected to the brake pipe 6 and containing a piston 9, and a valve chamber 10, connected to the main reservoir 4 and containing a slide valve 11 adapted to be operated by the piston 9.

The motorman's brake valve device 1 may comprise a casing having a valve chamber 12, connected to the main reservoir pipe 13 and containing a rotary slide valve 14 adapted to be operated by a handle 15.

The conductor's door controlling valve device 7 may comprise a casing having a valve chamber 16 connected to the main reservoir pipe 13 and containing a rotary slide valve 17 adapted to be operated by a handle 18.

The seat of the rotary valve 17 has ports leading to a door opening pipe 19 and a door closing pipe 20, said pipes being connected to a door engine for operating the car door which is to be controlled by the conductor, such as the center door of the car.

The motorman's brake valve is also provided with ports leading to a door opening pipe 21 and a door closing pipe 22 for controlling a door engine for operating the car door which is to be controlled by the motorman.

Interposed in the brake cylinder pipe 23 is a double check valve device comprising a casing 24, containing a double check valve 25, subject on one side to the pressure of a coil spring 26.

The door opening pipe 19, controlled by the conductor's door controlling valve device 7, leads to one side of the double check valve 25 and when the double check valve is seated in one direction, communication is opened through the brake cylinder pipe 23. When the double check valve is seated in the opposite direction said communication is closed and communication is opened from the pipe 19 to the brake cylinder 3.

In operation, the motorman may control the application and release of the brakes and the opening and closing of the car door at the operating end of the car by manipulation of the brake valve handle 15.

If the motorman desires to make a straight air application of the brakes, he moves the brake valve handle 15 to straight air application position, in which fluid under pressure is supplied to the straight air pipe 5 and thence through a cavity 27 in the emergency slide valve 11 to the brake cylinder pipe 23.

Normally, the rotary valve 17 of the conductor's valve device 7 is in the position shown in the drawing, in which the door opening pipe 19 is connected through a cavity 28 in the rotary valve 17 with an exhaust port 29, while the door closing pipe 20 is supplied with fluid under pressure through a port 30, so that the center car door is normally held closed.

The face of the double check valve which is open to the pipe 19 being thus at atmospheric pressure, the double check valve 25 will be in the position shown in the drawing and fluid supplied to the straight air pipe will flow through the pipe 23 past the double check valve to the brake cylinder 3.

If the conductor desires to open the car door under his control, and the motorman has not made an application of the brakes, he moves the handle 18 to the door opening position, in which fluid under pressure is supplied to the door opening pipe 19.

This operation to open the car door and at the same time fluid supplied to the pipe 19 shifts the double check valve 25, so as to close communication from the emergency valve device 2 to the brake cylinder and open communication from pipe 19 to the brake cylinder.

The brakes are thus applied whenever the conductor mainpulates the conductor's valve device 7 to open the car door.

If a straight air application of the brakes has been made by the motorman and the pressure of air supplied to the brake cylinder plus the pressure of the spring 26 exceeds the pressure of fluid supplied to the pipe 19 when the conductor operates the valve 7 to open the car door, then the double check valve will remain in the position shown in the drawing and no air will be supplied from the pipe 19 to the brake cylinder, so that a saving of air is effected.

Having now described my invention, what I claim as new and desire to secure by Letters Patent, is:

1. The combination with a brake cylinder, of a brake valve device for controlling the supply of fluid under pressure to the brake cylinder for effecting a straight air application of the brakes, a manually operated valve device for controlling the supply of fluid under pressure for operating a car door, and a double check valve device operated by fluid supplied for controlling the car door for opening communication for supplying fluid to the brake cylinder.

2. The combination with a brake cylinder, of a brake valve device for controlling the supply of fluid under pressure to the brake cylinder for effecting a straight air application of the brakes, a pipe through which fluid is supplied to the brake cylinder, a manually operated valve, a pipe through which said valve supplies fluid under pressure for controlling a car door, and a double check valve for controlling communication from said pipes to the brake cylinder.

3. The combination with a brake cylinder, of a brake valve device for controlling the supply of fluid under pressure to the brake cylinder for effecting a straight air application of the brakes, a pipe through which fluid is supplied to the brake cylinder, a manually operated valve, a pipe through which said valve supplies fluid under pressure for controlling a car door, and a double check valve subject on one side to the pressure of a spring and the straight air pipe pressure and on the other side to the door control pipe pressure for controlling communication from said pipes to the brake cylinder.

In testimony whereof I have hereunto set my hand.

CHRISTOPHER P. CASS.